Figure 1:
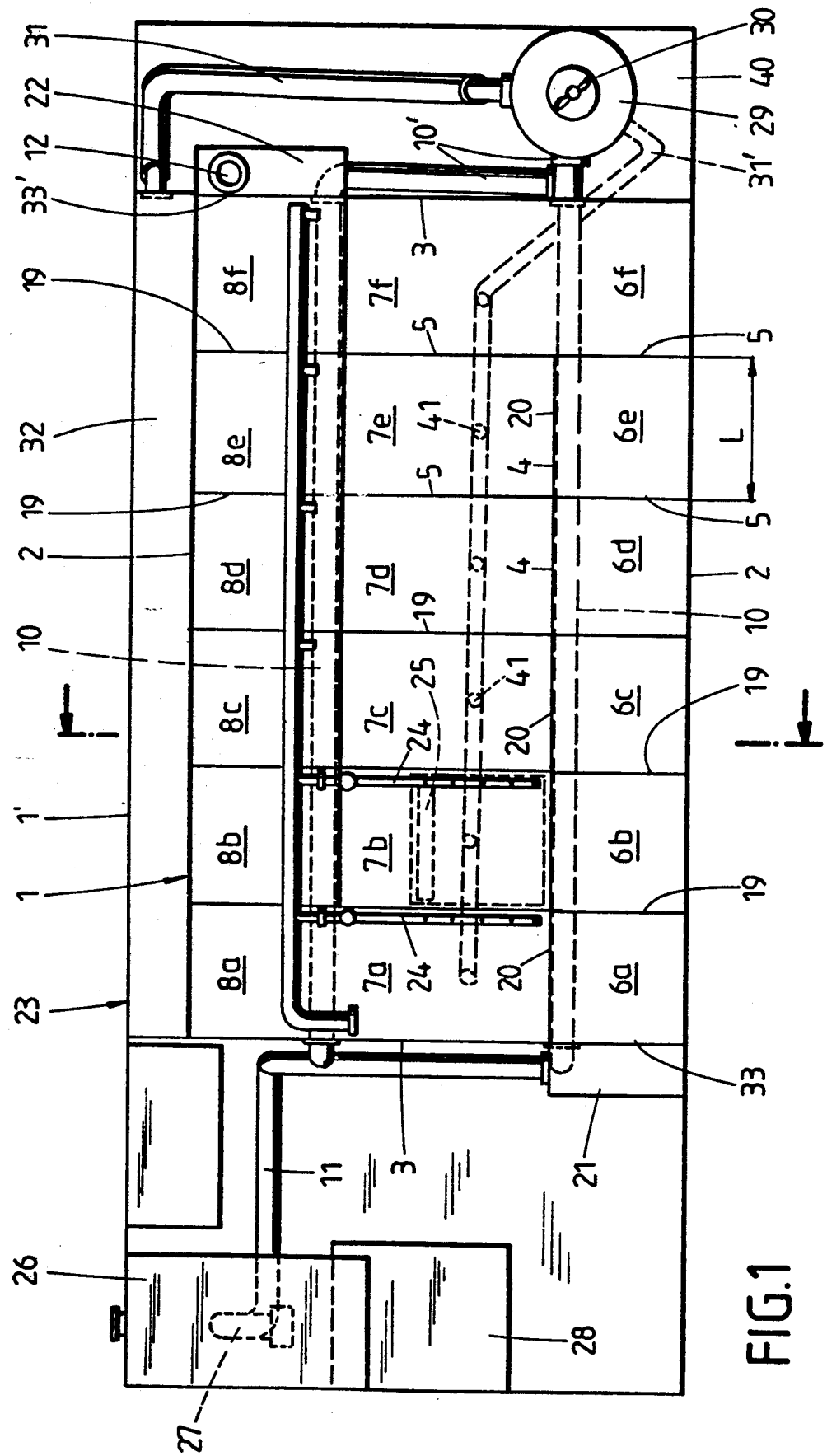

United States Patent [19]

Pape et al.

[11] Patent Number: 5,011,605

[45] Date of Patent: Apr. 30, 1991

[54] SEWAGE TREATMENT PLANT

[75] Inventors: Stefan Pape, Recklinghausen; Hans-Joachim Bassfeld, Wesel, both of Fed. Rep. of Germany

[73] Assignee: Envicon Luft- und Wassertechnik GmbH & Co. KG, Fed. Rep. of Germany

[21] Appl. No.: 426,077

[22] Filed: Oct. 11, 1989

[30] Foreign Application Priority Data

Oct. 11, 1988 [WO] PCT Int'l Appl. .. PCT/EP88/00910
Mar. 28, 1989 [WO] PCT Int'l Appl. .. PCT/EP89/00327

[51] Int. Cl.$^5$ ............................................. C02F 3/02
[52] U.S. Cl. ............................ 210/615; 210/624; 210/626; 210/151; 210/195.1; 210/202; 210/239; 210/253; 210/259; 210/749
[58] Field of Search ............ 210/615, 624, 626, 151, 210/195.1, 202, 220, 239, 253, 259, 803, 749

[56] References Cited

U.S. PATENT DOCUMENTS

| 732,208 | 6/1903 | Mitchell | 210/202 |
|---|---|---|---|
| 978,889 | 12/1910 | Imhoff | 210/615 |
| 1,456,914 | 5/1923 | Coombs | 210/253 |
| 1,904,916 | 4/1933 | Coombs | 210/624 |
| 2,907,463 | 10/1959 | Light et al. | 210/202 |
| 3,735,870 | 5/1973 | Uden | 210/259 |
| 4,680,111 | 7/1987 | Ueda | 210/615 |
| 4,892,651 | 1/1990 | Hill | 210/151 |

FOREIGN PATENT DOCUMENTS 1381078 3/1988 U.S.S.R. .
187315 10/1922 United Kingdom .

Primary Examiner—Stanley Silverman
Assistant Examiner—Christopher Upton
Attorney, Agent, or Firm—John F. A. Earley; John F. A. Earley, III

[57] ABSTRACT

A sewage treatment plant for the purification of waste water includes a chamber container (1) divided by partitions (4) into different sections (6, 7, 8) for pretreatment, biological treatment, chemical treatment, intermediate or retreatment of waste water, each section (6, 7, 8) having several chambers (6a through f, 7a through f, 8a through f) separated from one another by dividing walls (4, 5), chambers (6a through f, 7a through f, 8a through f) being linkable, with regard to inflow technique, in any pre-selectable association depending on the quantity and type of waste water to be treated, and at least one installation for removal of deposited treatment sludge in each of the areas for pretreatment, intermediate treatment and retreatment.

23 Claims, 3 Drawing Sheets

SEWAGE TREATMENT PLANT

Sewage treatment plants for treating home, community and industrial sewage have been known for a long time. Most sewage treatment plants are permanently installed and as a rule, the waste water first runs through a pretreatment stage, then a biological treatment stage and finally a retreatment stage. The treatment sludge drawn from the pretreatment and retreatment procedures is then stabilized, partly sterilized and then utilized or disposed of. The biological treatment of the waste water can be done in various ways. The best known procedures are those of activated sludge and solid-state materials.

The disadvantage of large sewage treatment plants is that they only work economically as of a certain quantity of waste water. The disadvantage of smaller sewage treatment plants is that they can only be adapted to different quantities/qualities of waste water with difficulty or not at all. Quantity of waste water, concentration and type of impurities can sometimes vary considerably, however, for example by different living habits in the course of a day or by season-related waste waters (for example those of hotels, agricultural activity, vacation settlements, etc.). In the process it can also happen that, for example, on days off, during vacation or off season, no more waste water at all flows in. However, since the biological circulation of a sewage treatment plant needs a more or less constant portion of active biomass, there is no choice but to shut the plant down and start it up later. This is not only extremely complicated, tedious and costly, it also results in the need to drain off or intermediately store any waste waters in untreated state in the mean time, causing odor problems, etc.

Even with varying qualities of waste water, there are considerable problems particularly with smaller sewage treatment plants, because within given treatment stages only one certain specified waste water treatment is possible.

The invention is based on the task of providing a sewage treatment plant that can be easily and flexibly adapted to different quantities and qualities of waste water. In so doing, the plant should be structured in such a way that it can be further operated without modifications for a long time even in times when no new waste water flows in.

Based on the concept that by
sedimentation periods of different lengths in pretreatment,
different treatment methods in the biological treatment phase and
change in length of treatment of the waste water, and sequential repetition of the individual treatment steps, waste waters that are under different strains or different waste water quantities in a sewage treatment process can be "manipulated" in their biological processes, the invention is based on the finding that with respect to the assignment of the different treatment steps, a sewage treatment plant must be structured flexibly for adaptation to different waste water quantities and qualities.

The invention thereupon refers to a sewage treatment plant for waste water purification, subdivided by partitions into different sections for pretreatment, biological treatment, intermediate and/or retreatment of the waste water, wherein each section has several chambers separated from one another by partitions and the chambers can be connected with each other with regard to input technique, in any pre-selectable association depending on the quantity and type of waste water to be treated, as well as with at least one installation for removal of deposited treatment sludge in each of the areas for pretreatment, intermediate treatment and retreatment.

It is, first of all, decisive that the different treatment sections (pretreatment, biological treatment step, intermediate and/or retreatment) are not set up permanently as independent sections, but are themselves divided into individual chambers, with the chambers linkable in any desired association. The purpose of this is to enable individual setting of the path of the waste water through the sewage treatment plant as a function of waste water quantity and quality, and to thus be able to run the sewage treatment plant in one, two or several steps, for example.

One-step operation means the waste water comes by way of the pretreatment stage into the biological treatment stage and then into retreatment. The one-step procedure can itself be structured differently. If the individual areas consist of six chambers each, for example, the waste water can be led according to quantity and quality into the individual areas through a preselected number of chambers, with the flow path set by corresponding connection of the chambers.

Two or several steps means the individual treatment steps are themselves subdivided in such a way that, for example, the waste water runs through the biological treatment steps twice or several times on its way through the sewage treatment plant and is meanwhile repeatedly subjected to an intermediate treatment with, in this case, preferably the corresponding pretreatment and retreatment chambers serving as intermediate treatment chambers, before the waste water is drained off into a main ditch through the final sedimentation step, for example.

In this way the sewage treatment plant takes on a sort of labyrinth character, in which the route through the labyrinth can be adjusted from the outside. In one model of this, the partitions between adjacent chambers are provided with openings that can be closed by valves.

The valves, which can be simple sliders, for example, can be operated mechanically, electrically, hydraulically or pneumatically and connect two chambers in such a way that the waste water can overflow, or separate the chambers from one another (in locked position).

An alternative consists of edge elements being set on the upper edges of the partitions, practically as guiding elements for the waste water which then flows over the edges of the partitions from one chamber into the next.

The partitions themselves may also be vertically adjustable. The water then flows under the partitions from one chamber into the next.

It is preferable to have the chambers of the individual treatment sections arranged in lengthwise rows and each equally large. Surprising advantages result from this simple geometrical arrangement. They can be explained with the example of a sewage treatment plant in which the chambers of the individual sections are arranged in three rows next to one another, with the middle row representing the biological treatment step. If the waste water is only pretreated through two chambers, a considerably greater portion of organic substances remains in the waste water than if the pretreatment is done through four chambers. The waste water is led through an open valve from the second chamber into the adjacent second chamber of the biological treatment step and from there against the direction of flow in pretreatment into the next chamber. The biological treatment takes place under high load due to the short pretreatment.

At a constant oxygen level, sometimes anaerobic treatment conditions can occur. The waste water thus treated then passes through more opened valves into the first retreatment chamber and there it must run at least through three retreatment chambers, to then be transferred into a further biological treatment chamber. Through the high load operation in the first biological treatment step, only microorganisms are selected there that decompose the portion of easily decomposable substances in the waste water. There is a correspondingly high portion of suspended solids (biological sludge) that finds its way into the adjoining treatment step which, as described, is extended due to the geometrical form of the sewage treatment plant, in such a way that a longer dwell period for the sedimentation of the biological sludge is automatically achieved.

If waste water must be prepared that has a greater portion of substances that are hard to decompose, it might be preferable to run the pretreatment through three or four chambers and to adjust the other treatment steps accordingly.

In this way the sewage treatment plant can be adapted to completely different waste water quantities and qualities.

For example, the treatment sludge can be drained off carefully through screw conveyors or drain pipes in the area of the lateral treating chambers for pretreatment, intermediate treatment and/or retreatment. The sludge is preferably discharged immediately into a container for sludge storing or sludge treatment, with said container, preferably arranged with the remaining components in a compact container, becoming of particular importance according to the invention. The container should namely serve the purpose of intermediate storage and prestabilization of the treatment sludge and have a pipe for partial return of the prestabilized sludge into one of the chambers. In this way it becomes possible to maintain the biological operation of the plant during periods when there is a lower waste water influx or no additional waste water at all flows in, by the fact that the biomass necessary for the biological activity level is no longer or only partially provided by incoming waste water, but rather by a corresponding quantity of returned, prestabilized sludge.

The invention accordingly also includes a procedure for waste water purification using at least one biologically effective treatment chamber in which the separated or drawn off sludge is intermediately stored and prestabilized and in the event of an insufficient supply of waste water entering the reaction chamber(s), an amount of the prestabilized sludge necessary to maintain the reaction process taking place therein is fed into one or more of the reaction chambers.

This is regardless of which procedure the waste water purification is following. This also applies to the previously described plant, the biological treatment step of which can be operated anaerobically or aerobically in the activated sludge process or in the solid-state material process. The individual chambers accordingly have appertaining aeration installations and/or solid bed materials as known from the present state of the art. A chemical treatment is also possible, for example through flocculation or precipitation.

The intermediate storage of the treatment sludge in the container can take place under anaerobic conditions. But it is also possible, during storage in the container, to ensure an aeration corresponding to the endogenous oxygen consumption of the sludge, in order to continuously maintain the metabolism process in the sludge.

The sludge quantity brought back from the container is preferably chosen in such a way that the biological strain on the treated waste water is constant.

The sewage treatment plant can be arranged compactly in a container and include all the procedural steps from pretreatment to sludge treatment. A particular advantage is that in spite of the possibility of providing completely different treatment paths, the sewage treatment plant does not need to be changed structurally except for the setting of the flow paths. This also applies, for example, to the installations for removal or intermediate storage and return of the treatment sludge. Nevertheless, the pretreatment sections, the biological treatment space or the retreatment sections can be broadly reduced or enlarged and thus adapted to the local characteristics.

Of course the usual installations, not mentioned above, that belong to this type of sewage treatment plant are also present. A mechanical pretreatment installation can thus be arranged in the container, connected by a pipe with a supply chamber from which the waste water, for example, passes through an overflow into the first pretreatment chamber. For running off the treated water, the final chamber, for retreatment, is intended to be directly or indirectly connected to a main ditch. An outlet chamber can be placed between these steps.

Either the sludge is led through the above-mentioned screw conveyor directly into the treatment container, where it can be aerobically (thermically) treated and stabilized, or it can also be (pre)stabilized and, as described, at least partly led back into the biological treatment steps. Lastly, the container can be formed as simple staple container.

Further characteristics of the invention result from the characteristics of the sub-claims as well as the other registration documents.

In the following examples of models, the invention is explained by illustration. A pure diagram form is used to represent FIG. 1: a top view of a sewage treatment plant arranged in a container with the appertaining peripheral equipment, FIG. 2: a perspective partial view of the chamber container of the plant according to FIG. 1, FIG. 3: a horizontal cross-section through a partition in the area of an opening with a slider.

Figure 5:
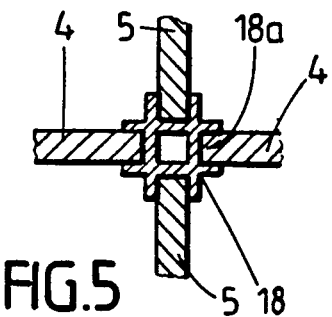
Figure 4:
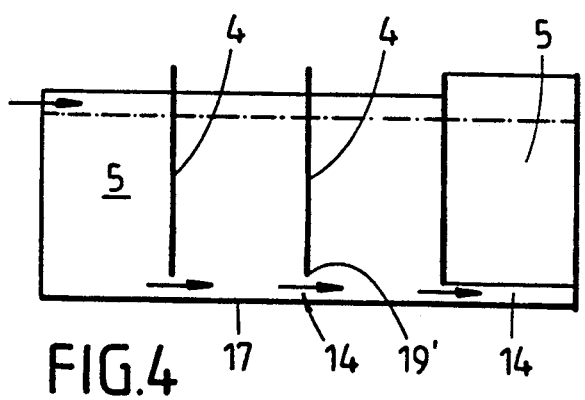
Figure 7:
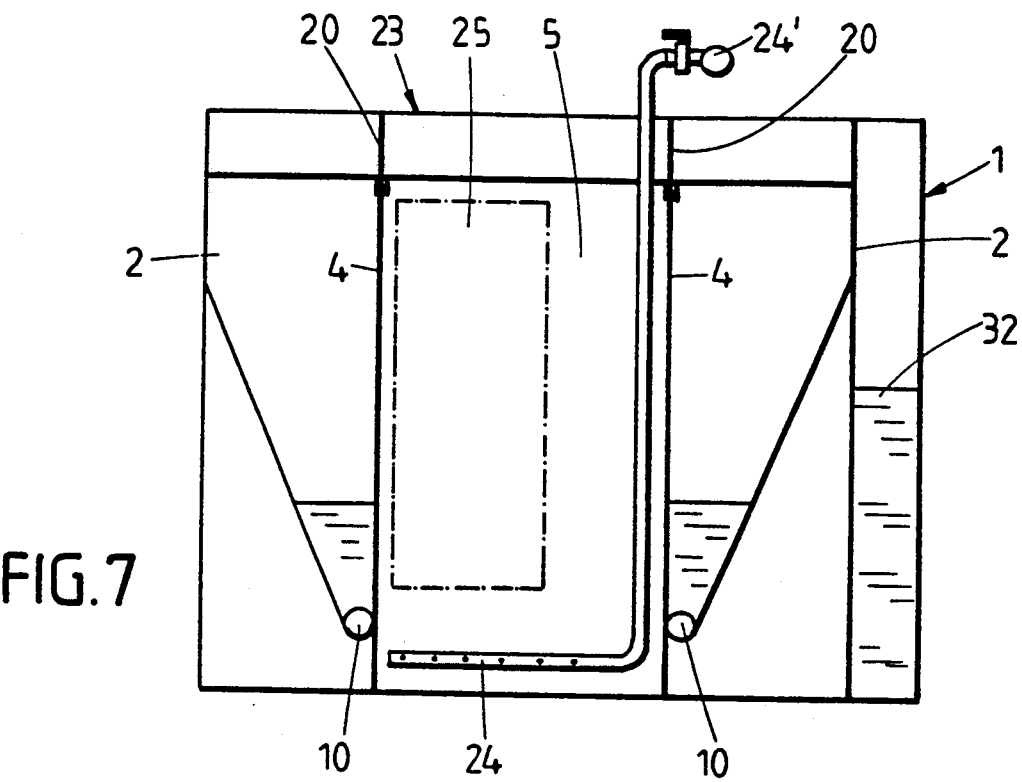
Figure 6:
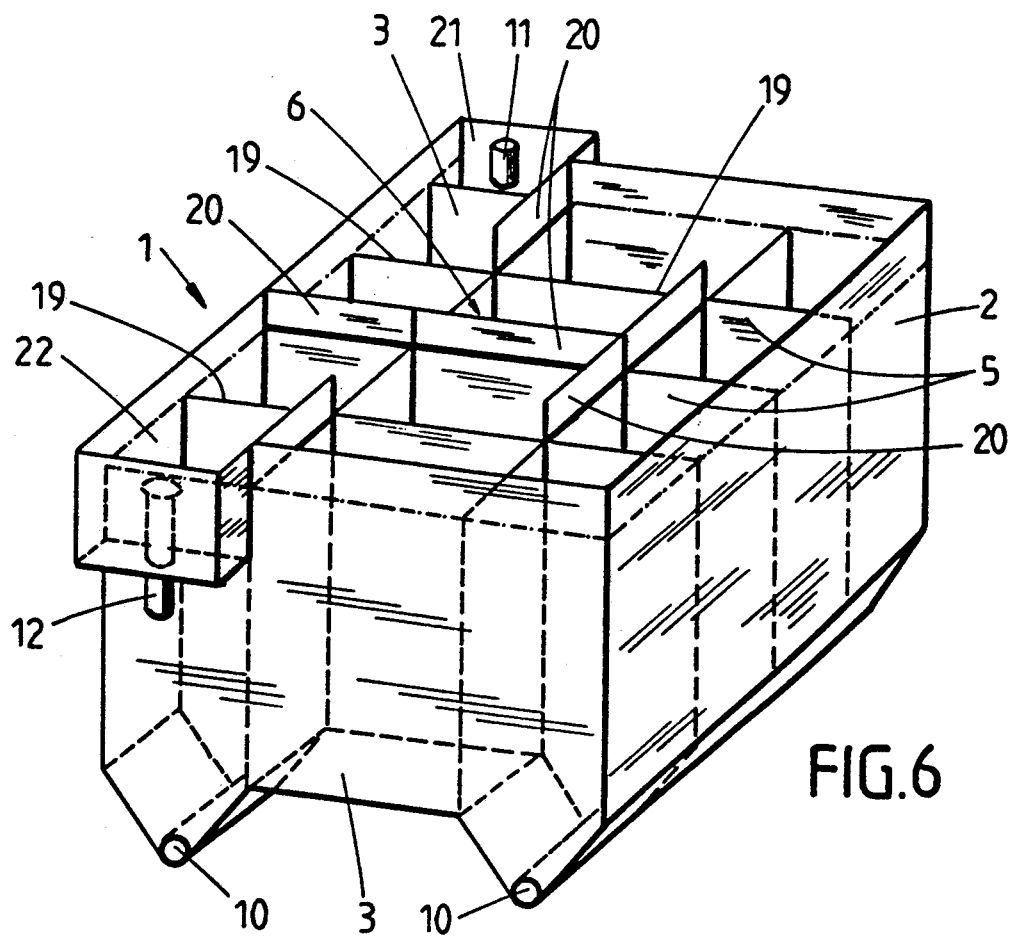

FIG. 4: a another model of a chamber container,

FIG. 5: a horizontal cross-section through a connecting point between various partitions of the container according to FIG. 4, FIG. 6: another model of a chamber container in perspective representation, FIG. 7: the container according to FIG. 6 in a longitudinal sectional view.

Figure 2:
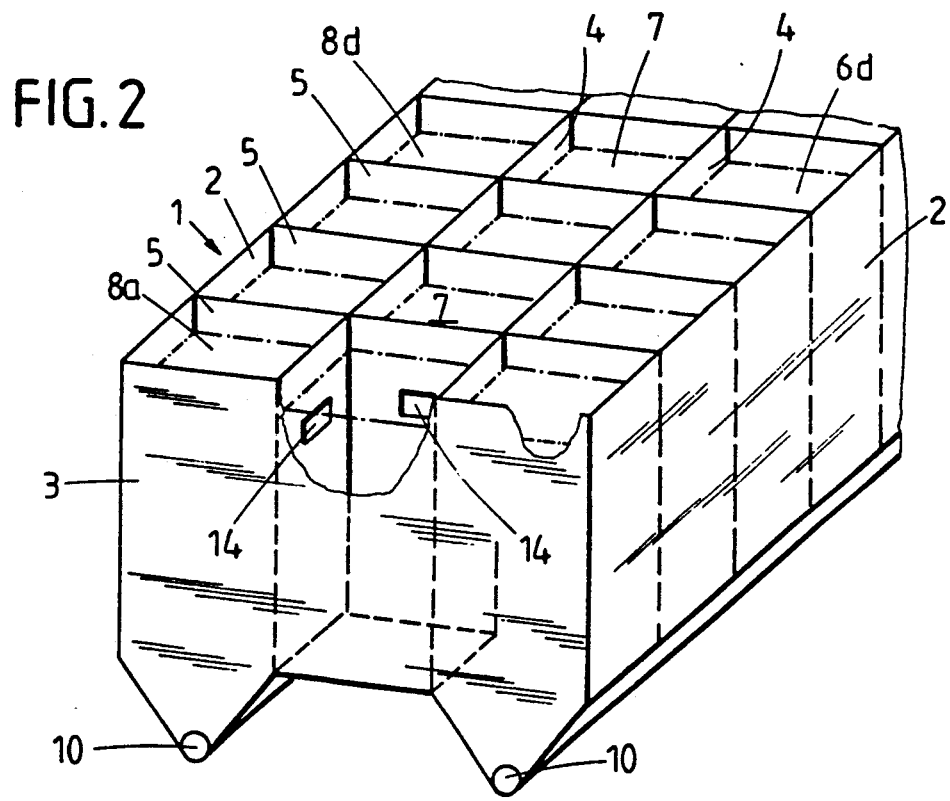

Identical or identically functioning components are identified by identical reference numbers in the diagrams. The term "chamber container" encompasses the entirety of the chambers of the individual treatment steps for treatment of waste water, The chamber container consists of welded steel plates. In the top view, it has a rectangular shape and has two side walls 2 and two front walls 3. Two partitions 4 run lengthwise through the chamber container 1 and at a distance from one another. In this way the chamber container 1 is divided into three lengthwise running sections 6, 7, 8. Each section 6, 7, 8 is furthermore divided by transverse dividing walls 5 into six chambers 6a through f, 7a through f and 8a through f. FIGS. 1, 2 and 6 show that the dividing walls 5 between the side walls 2 run in alignment with or at a distance from each other and chambers 6a through f, 7a through f and 8a through f are of identical length L because of this.

As FIG. 2 shows, the individual chambers are of different heights. The outer chambers 6a through f and 8a through f are groove-shaped in their lower section and protrude with this section, V-shaped in the longitudinal view, downwards over the middle chambers 7a through f.

In this lower section a screw conveyor 10 is arranged lengthwise in each chamber row 6, 8, sticking through corresponding openings in the dividing walls 5. The screw conveyors 10 are coupled to a drive motor (not shown) at one end (before chambers 6a, 8a) and stick through the rear dividing walls of chambers 6f, 8f, with their other end, into a space 40 described in more detail later. The screw conveyors 10 run through various (not shown) bearings.

Figure 3:
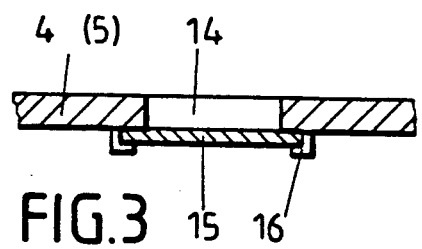

Openings are provided in the partitions 4 and dividing walls 5 between adjacent chambers 6a through f, 7a through f and 8a through f. As FIG. 3 shows, the openings 14 can be closed off or opened by vertically adjustable sliders 15, with the sliders 15 running over lateral guide rails 16 with a stopper at the lower end. The sliders 15 can be raised mechanically over the upper edge 19 and attached over appropriate stopping means to free the openings 14 completely or partially. Motor-driven drive parts can also serve to raise or lower the sliders 15.

Other types of valves, stops or the like can also be used instead of sliders.

Another type of connection of chambers 6a through f, 7a through f and 8a through f with respect to inflow technique is shown by FIGS. 4 and 5. There the partitions 4 or the dividing walls 5 are no longer welded together but rather are led vertically adjustable over vertical posts 18 in corresponding vertical mountings 18a. The adjustability of the walls 4, 5 can be achieved in the same way as described above using sliders 15. In the raised position, openings 14 are created, as FIG. 4 shows, between the bottom 17 of the chamber container 1 and the lower edges 19' of the walls 4, 5, and through these openings adjacent chambers 6a through f, 7a through f and 8a through f can be connected with one another.

The waste water flow can be regulated precisely through these connections according to which openings 14 are closed and which are open.

As FIG. 1 shows, the waste water is first pumped through an installation 26 for mechanical pretreatment with a gravity screen 27 and a collecting container 28 for separated dirt particles, through a pipeline 11 into an intake chamber 21 which is arranged, in FIG. 1, at the left front wall 3 of the chamber container 1. The waste water flows from there over an overflow edge 33 into chamber 6a which forms a first chamber for pretreatment.

In the model represented, chamber 8f situated directly across is arranged in the retreatment area and from there the waste water passes over an overflow edge 33' into an outlet chamber 22, which is formed with an outlet pipe 12 on the bottom through which the waste water is led away, for example into a main ditch (not shown).

The route of the waste water from chamber 6a to chamber 8f can be travelled in extremely different ways according to the invention.

In a one-step procedure, for example, chambers 6a through f are linked through the openings 14 in such a way that all chambers 6a through f serve the process of pretreatment, before the waste water goes through the opening 14 between chambers 6f, 7f into the middle chamber row that performs the biological waste water treatment and flows through the openings 14 in the dividing walls 5 from chamber 7f through chambers 7e through b into chamber 7a. Each chamber 7f through 7a has an aeration installation 24 arranged above the bottom, each connected to a central air pipe 24' and through which oxygen is blown into the waste water. In addition, agitators (not shown) can be provided. The biological treatment of the waste water in chambers 7f through 7a can take place according to the activated sludge process; but it is also possible to arrange solid bed materials in the individual chambers 7f through 7a, for example dip materials 25 for a solid-state material process.

After biological treatment, the waste water goes through the opening 14 between chambers 7a, 8a into chamber 8a and from there through chambers 8b through 8e into chamber 8f, with the chamber row 8a through 8f serving the process of retreatment, before the waste water is led away through the outlet chamber 22.

The invention also makes it possible to structure the one-step method completely differently, with pretreatment taking place only through chamber 6a, b, for example, before the waste water runs through the biological treatment chambers 7b, 7a and, in turn, retreatment chambers 8a through f. Accordingly, as opposed to the above described variant, the openings between chambers 6b, 6c and 7b, 7c are now closed to lead the waste water accordingly. Such a procedure is particularly recommended in low load operation or for waste waters with a large portion of nemathodes, for example.

The above chamber configuration can also be used for a multi-step procedure. In this case, the opening 14 between chambers 8c and 8d is closed, for example, and the waste water flow is led through chambers 6a, 6b, 7b, 7e, 8a, 8b, 8c, 7c, 7d, 6d, 6e, 6f, 7f, 7e, 8e, 8f into the outlet chamber 22.

In the process, chambers 7a through f of row 7 are exclusively for biological treatment, while chambers 8a through c and 6d through f now fulfill the task of intermediate treatment, before the waste water is retreated in chambers 8e, f.

In this procedure, the waste water is purified in three distinct biological treatment steps with corresponding intermediate treatment. In this procedure, because of the structure of the sewage treatment plant, the sedimentation path in the first intermediate treatment (chambers 8e through c) is forcibly extended, with high charge in the first biological treatment step (chambers 7b, 7a), in such a way that the increased portion of excess sludge can deposit sediment for a longer dwell period and a waste water with considerably less sludge goes from the third chamber 8c of the first intermediate treatment into the second biological treatment step.

The deposited sludge is led by means of the screw conveyors 10 and connected conveyor pipes 10' into a sludge treatment container 29 which is equipped with an aeration installation 30. In the container 29, the sludge is aerobically treated and stabilized, with the exothermic reaction creating a temperature level suitable for the stabilization. If necessary the container 29 can also be heated further. The stabilized sludge is conveyed through a pipe 31 into a staple container 32 which, in the model according to FIG. 1, is arranged laterally next to the chamber container 1 within the container 1'.

It is also possible to anaerobically treat the treatment sludge in the container 29 or to provide for an aeration corresponding to the endogenous oxygen consumption of the sludge, to maintain the metabolism processes in the sludge and then lead the thus prestabilized sludge back into a biological treatment chamber 7a through f in determined partial quantities through the pipe 31' with valves 41. In this way, particularly for an activated sludge procedure, the biomass needed to maintain the metabolism processes can always be maintained, even if the waste water supply decreases or no added charged waste water at all flows in. The sewage treatment plant can thus easily compensate for even greater variations in the waste water supply and practically supply itself "autonomously". This leads to the considerable advantage that the plant can be individually adapted even for varying waste water quantities and waste waters with the highest variation in biological charges, without changing the structure in any way. If the portion of single microorganisms/enzymes increases or decreases seasonally, for example, this can be dealt with immediately by correspondingly adjusting the plant as described above.

The individual components of the plant can be formed in various ways. Instead of the funnel shape of chambers 6a through f, 8a through f towards the bottom, the corresponding outer walls can also run wedge-shaped towards the inner walls (FIG. 7).

The chamber container can also have a round bottom surface and the chambers are then formed as circular sectors, for example. The chamber container can also have a triangular or multiangular shape. The individual chambers can also be formed by plastic containers lying against each other with their corresponding surfaces, with the openings then preferably formed as shown in FIG. 2, each extending through two walls next to one another. These plastic containers are preferably produced in stretch forming.

Another model for linking the individual chambers is shown in FIG. 6. Instead of openings 14, edge elements 20 are detachably placed on the upper edges 19 of individual partitions 4 or dividing walls 5, with the edge elements 20 being placed in alignment with the outer rim of the chamber container 1. In this model, the liquid level must be above the edges 19. The waste water is then led accordingly through the individual chambers to the assignment of the edge elements 20. The edge elements 20 can be slipped on, in the simplest of cases. They can also be fixed detachably on the edges 19 through slot and feather connections, loops or cotter pins.

We claim:

1. Sewage treatment plant for waste water purification, with a container divided by partitions into different sections having means for settling type treatment and for biological or chemical treatment, said sections for said settling type treatment comprising at least sections for pretreatment and retreatment of said waste water and including an influent chamber for said water within said pretreatment section and an effluent chamber within said retreatment section with each section having several chambers arranged side by side and separated from one another by dividing walls and in which adjacent chambers from either the same or a different section can be linked, with regard to inflow technique, in any preselectable association depending on the quantity and type of waste water to be treated, as well as with at least one installation for removal of deposited treatment sludge in each of said sections for pretreatment and retreatment.

2. Sewage treatment plant according to claim 1, wherein in the dividing walls between adjacent chambers, openings than can be closed by valves are provided.

3. Sewage treatment plant according to claim 1, further comprising edge components that can be detachably affixed on the upper edge of the dividing walls and protrude upwards over the liquid level of the waste water.

4. Sewage treatment plant according to claim 1, wherein the dividing walls are vertically adjustable along lateral guiding elements above the liquid level of the waste water and beyond.

5. Sewage treatment plant according to claim 1, wherein the chambers of the sections are each arranged in rows behind one another.

6. Sewage treatment plant according to claim 5, wherein the row with chambers for biological waste water treatment is arranged parallel next to the other chamber rows.

7. Sewage treatment plant according to claim 1, wherein the chambers, viewed in the longitudinal direction of the rows, are of identical length.

8. Sewage treatment plant according to claim 1, wherein the installation for removal of the treatment sludge comprises a screw conveyor which runs along a particular row of chambers at the bottom of the appertaining chamber and extends through corresponding openings in the dividing walls.

9. Sewage treatment plant according to claim 8, wherein an installation for transfer of sludge into an adjoining container for sludge storing or sludge treatment is connected to the outlet end of the screw conveyor.

10. Sewage treatment plant according to claim 9, wherein the container is formed closed to outside air for anaerobic intermediate storage of the treatment sludge and has a pipe for partial return of the prestabilized sludge into one of the chambers.

11. Sewage treatment plant according to claim 9, wherein the container is formed closed to outside air and has an installation for partial aeration of the sludge.

12. Sewage treatment plant according to claim 8, wherein the screw conveyor, seen in direction of flow, extends through the last dividing wall of a section into a container for sludge storing or sludge stabilization.

13. Sewage treatment plant according to claim 1, wherein the chambers for biological treatment of the waste water are formed with aeration installations.

14. Sewage treatment plant according to claim 1, wherein solid bed materials are arranged in the chambers for biological treatment of the waste water.

15. Sewage treatment plant according to claim 1, wherein the last retreatment chamber of a section in the direction of flow of the waste water has an outlet to an outlet chamber than can be connected to a main ditch.

16. Sewage treatment plant according to claim 1, further comprising
   at least one intermediate section, including one or more chambers, separated from one another by dividing walls, which chambers can be linked, with regard to inflow technique, to any adjacent chamber within said intermediate section and any adjacent chamber of said pretreatment, biological, chemical or retreatment section.

17. Sewage treatment plant according to claim 1, wherein
   the chambers for biological treatment of the waste water are formed with agitators.

18. Procedure for waste water purification using at least one biologically effective treatment chamber for varying waste water supply characteristics, particularly in a sewage treatment plant for waste water purification, with a container divided by partitions into different sections for settling type treatment and for biological or chemical treatment, said sections for said settling type treatment comprising at least sections for pretreatment and retreatment of said waste water and including an influent chamber for said water within said pretreatment section and an effluent chamber within said retreatment section, with each section having several chambers arranged side by side and separated from one another by dividing walls and in which adjacent chambers from either the same or a different section can be linked, with regard to inflow technique, in any preselectable association depending on the quantity and type of waste water to be treated, as well as with at least one installation for removal of deposited treatment sludge in each of said sections for pretreatment and retreatment, wherein, in a waste water purification following an activated sludge process, sludge drawn from a retreatment chamber or in a waste water purification following a solid-state body process, sludge drawn off from a retreatment chamber, is separated and stored in a sludge container for prestabilizing and in the case of supplying of the treatment chambers(s) with an insufficient influx of waste water to main operation of the treatment chamber(s), such a quantity of the prestabilized sludge is led into the treatment chamber(s) as necessary for maintaining the reaction processed taking place in the treatment chamber(s).

19. Procedure according to claim 18, wherein when using the solid-state body process, the primary sludge deposited during waste water pretreatment is also stored in the sludge container.

20. Procedure according to claim 18, wherein the sludge in the sludge container is stored under anaerobic conditions.

21. Procedure according to claim 18, wherein the sludge in the sludge container is aerated with a quantity of air corresponding to the endogenous oxygen consumption of the sludge.

22. A sewage treatment plant for waste water purification comprising
   a container divided by partitions into different sections having means for settling type treatment and for biological or chemical treatment, said sections for said settling type treatment comprising at least sections for pretreatment and retreatment of said waste water and including an influent chamber for said water within said pretreatment section and an effluent chamber within said retreatment section,
   each section having several chambers arranged side by side and separated from one another by dividing walls,
   adjacent chambers from either the same or a different section being linkable, with regard to inflow technique, in any pre-selectable association depending on the quantity and type of waste water to be treated,
   at least one installation for removal of deposited treatment sludge in each of said sections for pretreatment and retreatment,
   openings that may be closed by valves being provided in the dividing walls between adjacent chambers,
   edge components being provided that can be detachably affixed on the upper edge of the dividing walls and protrude upwards over the liquid level of the waste water,
   the dividing walls being vertically adjustable along lateral guiding elements above the liquid level of the waste water and beyond,
   chambers of the sections being arranged in rows behind one another,
   the row which chambers for biological waste water treatment being arranged parallel to the other chamber rows,
   chambers being of identical length when viewed in the longitudinal direction of the rows,
   the installation for removal of the treatment sludge consisting of a screw conveyor which runs along a particular row of chambers at the bottom the appertaining chamber and extending through corresponding openings in the dividing walls,
   an installation for transfer of sludge into an adjoining container for sludge storing or sludge treatment being connected to the outlet end of the screw conveyor,
   the screw conveyor seen in the direction of flow, extending through the last dividing wall of a section into a container for sludge storing or sludge stabilization,
   the container being formed closed to outside air for anaerobic intermediate storage of the treatment sludge and having a pipe for partial return of the prestabilized sludge into one of the chambers,
   the chambers for biological treatment of the waste water being formed with aeration installations,
   solid bed materials being arranged in the chambers for biological treatment of the waste water, and
   the last retreatment chamber of a section in the direction of the flow of the waste water having an outlet to an outlet chamber that may be connected to a main ditch.

23. A sewage treatment plant for waste water purification, comprising
   a container,
   a first partition located in the container dividing the container into a settling type treatment section means and a biological or chemical type treatment section means,
   a plurality of additional partitions located in the settling type treatment section dividing the settling type treatment section into a plurality of chambers,
   a plurality of additional partitions located in the biological or chemical type treatment section dividing the biological or chemical type treatment section into a plurality of chambers, inlet means for introducing waste water to the container, outlet means for removing treated waste water from the container, linking means for linking adjacent chambers from either the same or a different section to one another as desired to form a desired flow path of water through the sewage treatment plant, and removal means located in the settling type treatment section for removing deposited treatment sludge from the settling type treatment section.

* * * * *